United States Patent [19]

Circello et al.

[11] Patent Number: 5,101,341

[45] Date of Patent: Mar. 31, 1992

[54] PIPELINED SYSTEM FOR REDUCING INSTRUCTION ACCESS TIME BY ACCUMULATING PREDECODED INSTRUCTION BITS A FIFO

[75] Inventors: Joseph C. Circello, Phoenix; Richard H. Duerden, Scottsdale; Roger W. Luce, Phoenix; Ralph H. Olson, Scottsdale, all of Ariz.

[73] Assignee: Edgcore Technology, Inc., Scottsdale, Ariz.

[21] Appl. No.: 241,111

[22] Filed: Sep. 2, 1988

Related U.S. Application Data

[63] Continuation-in-part of Ser. No. 236,646, Aug. 25, 1988, and Ser. No. 236,449, Aug. 25, 1988, Pat. No. 5,029,070.

[51] Int. Cl.$^5$ .............................................. G06F 9/38
[52] U.S. Cl. ............................. 395/375; 364/259.9; 364/254.4; 364/263.1; 364/DIG. 1
[58] Field of Search ... 364/200 MS File, 900 MS File

[56] References Cited

U.S. PATENT DOCUMENTS

| | | | |
|---|---|---|---|
| 3,766,527 | 10/1973 | Briley | 364/200 |
| 3,902,163 | 8/1975 | Amdahl | 364/200 |
| 3,947,823 | 3/1976 | Padegs | 364/200 |
| 4,200,927 | 4/1980 | Hughes et al. | 364/200 |
| 4,287,561 | 9/1981 | Liptay | 364/200 |
| 4,323,964 | 4/1982 | Gruner | 364/200 |
| 4,390,946 | 6/1983 | Lane | 364/200 |
| 4,399,507 | 8/1983 | Cosgrove | 364/200 |
| 4,437,149 | 3/1984 | Pomerene et al. | 364/200 |
| 4,454,578 | 6/1984 | Matsumoto | 364/200 |
| 4,468,736 | 8/1984 | DeSantis et al. | 364/200 |
| 4,519,033 | 5/1985 | Vaughn et al. | 364/200 |
| 4,527,237 | 7/1985 | Frieder | 364/200 |
| 4,530,050 | 7/1985 | Fukunaga | 364/200 |
| 4,574,344 | 3/1986 | Harris et al. | 364/200 |
| 4,594,655 | 6/1986 | Hao | 364/200 |
| 4,604,691 | 8/1986 | Akagi | 364/200 |
| 4,613,935 | 9/1986 | Couleur | 364/200 |
| 4,620,275 | 10/1986 | Wallach et al. | 364/200 |
| 4,631,672 | 12/1986 | Sakamoto | 364/200 |
| 4,658,355 | 4/1987 | Hatakeyama | 364/200 |
| 4,683,549 | 7/1987 | Takaki | 364/900 |
| 4,685,080 | 8/1987 | Rhodes, Jr. et al. | 364/900 |
| 4,691,277 | 9/1987 | Kronstadt et al. | 364/200 |
| 4,700,291 | 10/1987 | Saito | 364/200 |
| 4,701,842 | 10/1987 | Olnowich | 364/200 |
| 4,722,050 | 1/1988 | Lee et al. | 364/200 |
| 4,742,451 | 5/1988 | Bruckert | 364/200 |
| 4,755,935 | 7/1988 | Davis | 364/200 |
| 4,760,519 | 7/1988 | Papworth et al. | 364/200 |
| 4,764,861 | 8/1988 | Stribuya | 364/200 |
| 4,777,587 | 10/1988 | Case | 364/200 |
| 4,794,524 | 12/1988 | Carberry | 364/200 |
| 4,811,215 | 3/1989 | Smith | 364/200 |

FOREIGN PATENT DOCUMENTS 59-02179h 2/1984 Japan.
2126384 3/1984 United Kingdom.

*Primary Examiner*—Thomas C. Lee
*Assistant Examiner*—Eric Coleman
*Attorney, Agent, or Firm*—Cahill, Sutton & Thomas

[57] ABSTRACT

A system and technique for providing early decoding of complex instructions in a pipelined processor uses a programmed logic array to decode instruction segments and loads both the instruction bits and the associated predecoded bits into a FIFO buffer to accumulate a plurality of such entries. Meanwhile, an operand execute pipeline retrieves such entries from the FIFO buffer as needed, using the predecoded instruction bits to rapidly decode and execute the instructions at rates determined by the instructions themselves. Delays due to cache misses are substantially or entirely masked, as the instructions and associated predecoded bits are loaded into the FIFO buffer more rapidly than they are retrieved from it, except during cache misses. A method is described for increasing the effective speed of executing a three operand construct. Another method is disclosed for increasing the effective speed of executing a loop containing a branch instruction by scanning the predecoded bits in establishing a link between successive instructions.

8 Claims, 6 Drawing Sheets

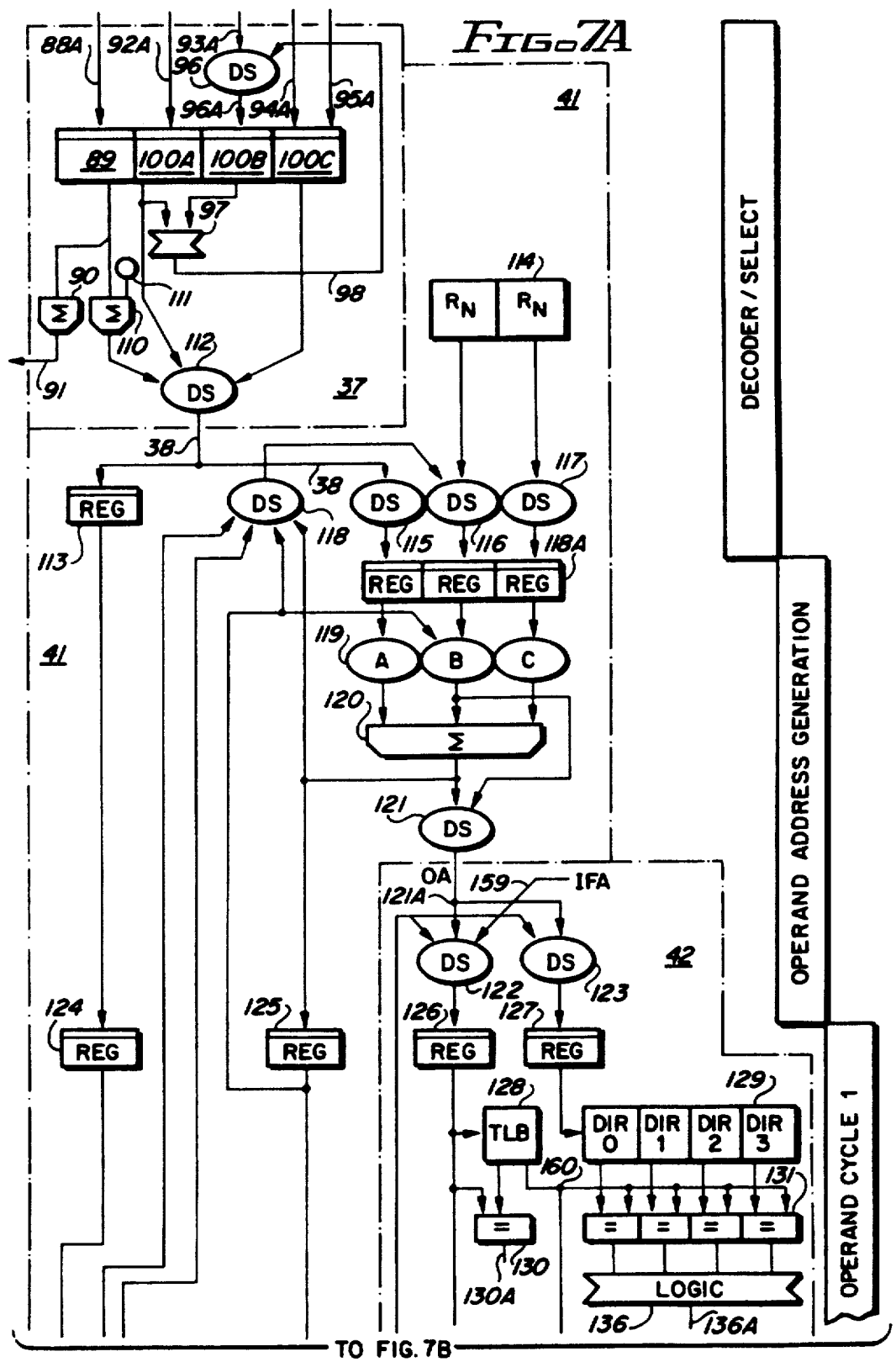

PIPELINED SYSTEM FOR REDUCING INSTRUCTION ACCESS TIME BY ACCUMULATING PREDECODED INSTRUCTION BITS A FIFO

CROSS-REFERENCE TO RELATED APPLICATION

This invention is a continuation-in-part of the co-pending application entitled "PIPELINE STRUCTURES AND METHODS" by Joseph C. Circello, Richard H. Duerden, Roger W. Luce, and Ralph H. Olson, Ser. No. 236,646 filed Aug. 25, 19898, assigned to Edge Computer Corporation, and "COHERENT CACHE STRUCTURES AND METHODS", by Daniel M. McCarthy, Joseph C. Circello, Gabriel R. Munguia, and Nicholas J. Richardson, Ser. No. 236,449, filed Aug. 25, 1988 now Pat. No. 5,029,070, assigned to Edge Computer Corporation, and incorporated herein by reference.

BACKGROUND OF THE INVENTION

The invention relates to structures and methods for decreasing the average instruction execution time for CISC (Complex Instruction Set Computer) type instructions in a pipelined architecture.

An approach to increasing computer system performance has been to design systems execute so-called RISC (Reduced Instruction Set Computer) instruction sets rather than CISC (Complex Instruction Set Computer) instruction sets. In RISC instructions set all instructions have the same length, and all use a so-called store-load architecture in which read and write operations from or to memory must be accomplished only with certain read and write instructions, whereas in CISC instruction sets it may be possible to include complex instructions that automatically effectuate certain read and write operations. Although RISC instruction sets at the present state of the art can be executed with Average Instruction Time (AIT) of only about 1.5 machine cycles per instruction, the "inflexibility" of RISC instruction sets often means that a much larger number of instructions must be included in a program to accomplish a particular task. In contrast, CISC instruction sets typically have an AIT of 10-15 machine cycles, but the number of CISC instructions required to accomplish a particular task may be far fewer than if RISC instructions are used. While each approach offers distinct advantages, at the present time it is unclear which approach will ultimately prevail. However, it is clear that it would be highly desirable if the AIT of executing CISC instructions could be substantially reduced, because the ease of programming with CISC instruction sets would be accompanied by the short AITs produced by RISC type architectures.

Pipelining techniques are well-known, wherein multiple stages of hardware, i.e., multiple pipelines, are provided so that each stage of the pipeline can be working on a different instruction at the same tim, even through it may take as many machine cycles as there are stages in the pipeline to complete each instruction from start to finish. As long as the pipeline is kept full and operating smoothly, the AIT of each instruction will be much shorter than if pipelining techniques are not used. For CISC computer architectures, it has been impractical to have enough pipeline stages to shorten AITs of CISC instructions to much less than 10 machine cycles per instruction. In prior machines, the usual approach is to provide an instruction fetch pipeline which performs the functions of generating instructions addresses and loading the fetched instructions into an instruction buffer. The contents of the instruction buffer are read by an operand execution pipeline in which sequential microcode execution steps, each of which requires at least one machine cycle, are performed, resulting in typical AITs of 10-15 machines cycles for CISC type computers.

SUMMARY OF THE INVENTION

Accordingly, it is an object of the invention to provide a system and method for substantially reducing the average instruction execution times of complex instructions by a computer.

It is another object of the invention to provide a way of providing the ease of programming characteristic of CISC instruction sets with the short instruction execution times of RISC type instruction sets.

It is another object of the invention to provide a technique for increasing the effective speed of executing a three operand construct.

It is another object of the invention to provide a method for increasing the effective speed of executing a loop containing a branch instruction.

Briefly described, and in accordance with one embodiment thereof, the invention provides a system and technique for increasing the speed of execution of complex instructions in a pipelined processor including circuitry for decoding, preferably in a single machine cycle, a plurality of bits of an instruction to produce a plurality of associated predecoded bits and storing both the bits of the instruction and the predecoded bits in a FIFO buffer and repeating this procedure to accumulate instructions and their respective associated predecoded bits in the FIFO buffer. Meanwhile, an operand execute pipeline retrieves individual entries from the instruction buffer as needed, each entry including the bits of an instruction and the associated predecoded bits. The retrieving continues as long as entries are available from the FIFO buffer. The technique masks delays due to cache misses, substantially improving average instruction execution times. The technique also allows scanning of predecoded bits to enable the operand execution pipeline to execute the instructions fetched from the FIFO buffer much more rapidly than would otherwise be possible.

The invention also provides a method of increasing the effective speed of executing a three operand construct in a computer that requires two instructions to execute a three operand construct by predecoding first and second instructions that represent a three operand construct, wherein the first instruction is a move instruction to move the contents of a first location, which can be a memory of register contents, or immediate data, into a second location, which can be a register, and wherein the second instruction performs a predetermined operation, such as an add, subtract, shift, negate, or logic function, on the contents of a third location, which can be a register contents or immediate data, and puts the results of that operation into the second location. The results of the predecoding are "scanned" or examined to determine if the move instruction is linked to the second instruction, and if it is, the predetermined operation then is performed on the contents of the first and third locations, and the results are put into the second location without executing the move instruction.

In another embodiment of the invention, a method is provided for increasing the effective speed of executing a loop containing a branch instruction by writing first information into a branch cache to prevent aborting an instruction fetch pipeline on each pass through the loop. The branch cache has enough bits to contain the branch condition, the address of the immediately preceding instruction, and the address of a target instruction of the branch instruction. On every pass through the loop except the first pass, a branch cache hit is produced at the address of the preceding instruction. By evaluating the branch condition in the branch cache and simultaneously executing the target instruction, the loop is repeated without executing the branch instruction.

BRIEF DESCRIPTION OF THE DRAWINGS

FIGS. 6, 7A, and 7B constitute a detailed logic diagram of the instruction fetch pipeline and operand execution pipeline shown in FIG. 5.

DETAILED DESCRIPTION OF THE PREFERRED EMBODIMENTS OF THE INVENTION

Instruction Fetch, Early Decode Pipeline

Figure 1:
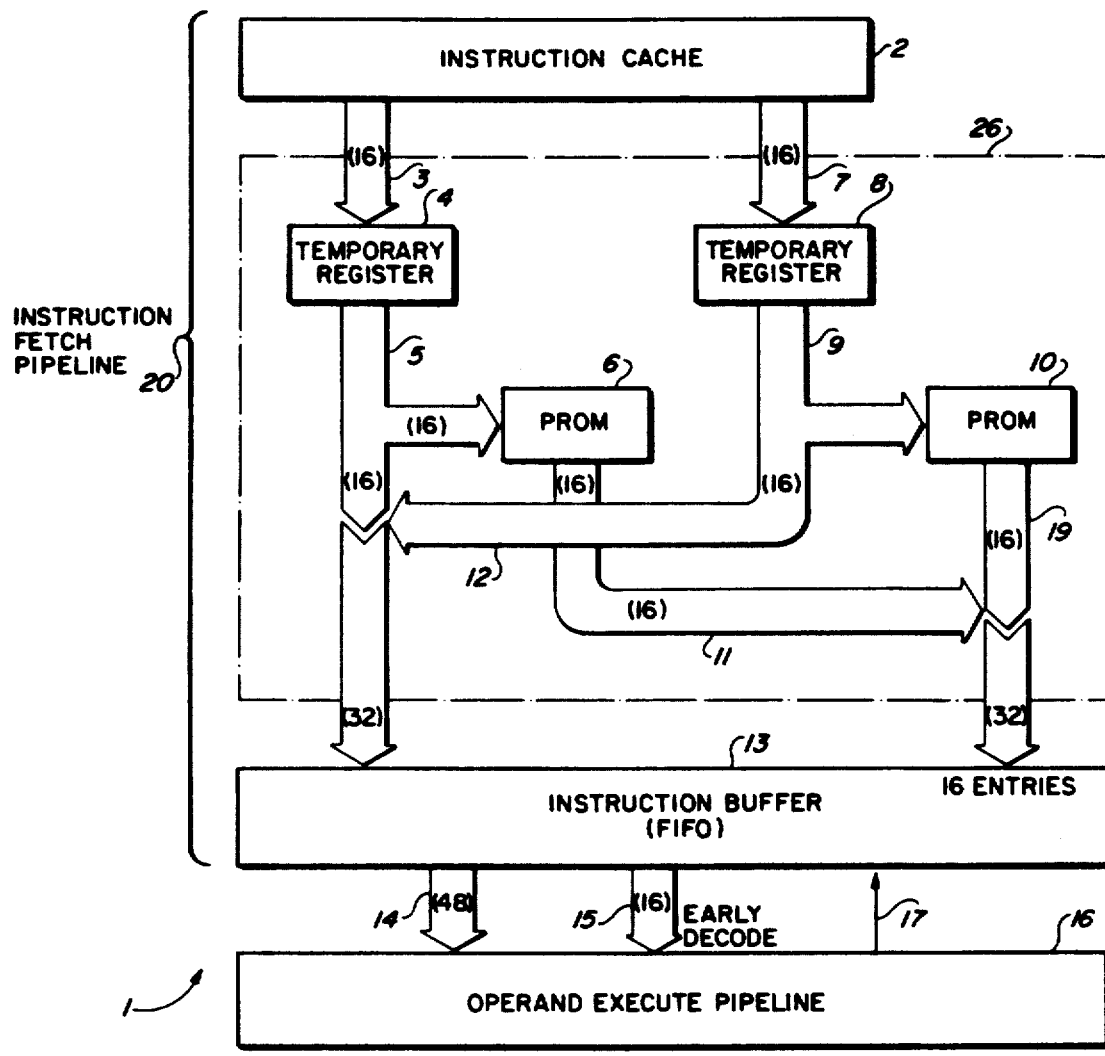
FIG. 1 is a schematic diagram illustrating the implementation of an early decode technique of an instruction fetch pipeline of a processor.

In FIG. 1, a portion 1 of a high performance computer system includes an instruction cache memory 2 which stores a large number of instructions previously loaded from a main "global memory" (not shown). The set of instructions in the instruction cache 2 includes the ones to be presently executed by an associated high speed instruction fetch pipeline 20 shown in FIG. 2. The instruction cache memory 2 is a very high speed memory, capable of operating at the same speed as a CPU 49 (FIG. 9), which operates many times faster than the much slower global memory 48.

Instruction cache 2 is 32 bits wide, and has 16 outputs designated by numeral 3 for loading a temporary register 4 with 16 bits of an instruction. Sixteen lines 7 load a second temporary register 8 with another 16 bits of that instruction.

The 16 output lines 5 of temporary register 4 are connected to inputs of an "elastic" FIFO (first in, first out) instruction buffer 13, in accordance with the present invention. The 16 lines 5 also are connected to address inputs of a PROM 6, which decodes the instruction bits on conductors 5 to produce 16 bits of "early decode" information on conductors 11, which also are connected to inputs of instruction buffer 13. Similarly, the 16 bits in temporary register 8 are applied to inputs of instruction buffer 13 and also to address input of PROM 10, which produces 16 more bits of early decode information on conductors 19, which also are connected to the inputs of instruction buffer 13.

The early decode information in the present embodiment of the invention includes five fields. The first three pertain to address generation, and include (1) a code to control address generation, (2) a code indicating the size of the operand, i.e., whether it is 8, 16, 32, ob 64 bits, and (3) a code indicating whether the instruction makes no memory access, a read memory access, a write memory access, or a read/modify/write memory access. The two remaining fields control the sequence of the instruction decoding and controlling the instruction buffer 13. These fields include (4) a code indicating whether the instruction is 16, 32, or 48 bits in length and (5) a decode field that maps an original 16 bit op code to a 5 bit field to perform one level of decoding. This is done only for complex instructions requiring two or more machine cycles, for example an instruction in which access is needed to a variable number of registers.

By having the early decoded results, the operand execute pipeline 16 then need not perform the large number of sequential microcode execution steps as done is operand execute pipelines of prior CISC architecture machines, and instead can perform "hardware" decoding, typically by means of PAL (Programmed Array Logic) arrays or PROMs (Programmable Read Only Memories) that require only one machine cycle. These 16 bits of early decode information also are fed into instruction buffer 13, which is 64 bits wide. Each line of instructions in instruction cache 2 can include 16 bit instructions, 32 bit instructions, and 48 bit instructions.

Instruction cache 2, the instruction registers 4 and 8, and the early instruction decode PROMs 6 and 10 constitute an "instruction fetch pipeline" 20. The instruction buffer 13, which contains up to 16 entries, is "loosely" coupled to an operand execute pipeline circuitry 16.

Figure 2:
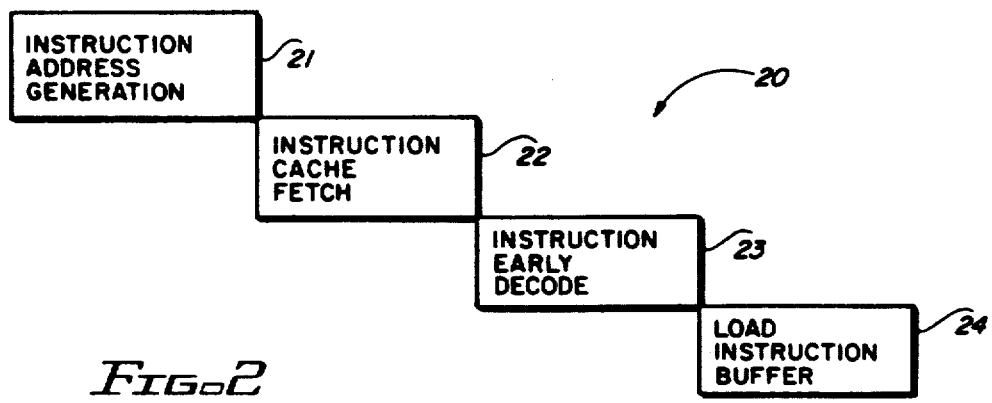
FIG. 2 is a diagram illustrating the instruction fetch pipeline in FIG. 1.

In FIG. 2 the four stages of the instruction fetch pipeline 20 are shown. Block 21 designates the step of generating addresses to be applied to the instruction cache 2. Block 22 designates accessing the instruction cache 2 to produce the outputs on conductors 3 and 7. Block 23 designates the instruction early decode function performed by PROMs 6 and 10 and loads the output of PROMs 6 and 10 into the instruction buffer 13, along with the undecoded instruction bits on conductors 5 and 9. Block 24 designates loading the instructions and associated predecoded bits into the operand execute pipeline 16.

Figure 5:
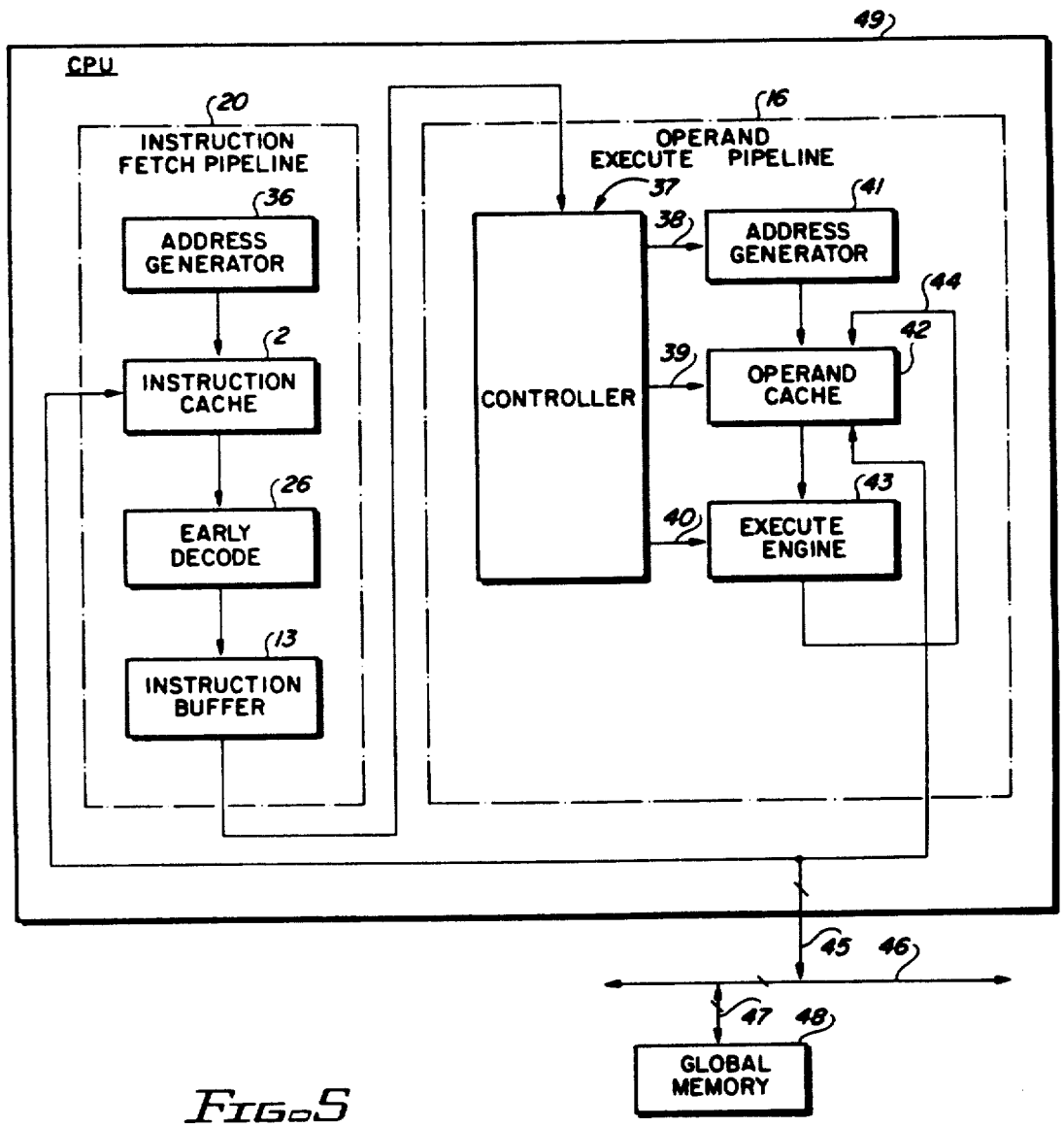
FIG. 5 is a block diagram illustrating the instruction fetch pipeline and operand execute pipeline in a CPU.

FIG. 5 shows how the early decode circuitry and other elements of the instruction fetch pipeline 20 and the elements of the operand execute pipeline 16 bit into a CPU 49.

In FIG. 5, the instruction fetch pipeline includes an address generator circuit 36 which addresses instruction cache 2. The contents of the instruction cache 2 are input to the early decode circuitry 26 described in FIG. 1. The output of the early decode section 26 in input to the instruction buffer 13 described above. The early decoded contents of instruction buffer 13 are fed into operand execute pipeline 16, and more specifically into a pipeline controller 37 thereof which is comprised of various timing and gating circuits needed to produce control signals 38, 39 and 40 which are output, respectively, to operand address generator 41, operand cache 42, and execute engine 43. The results produced by the execute engine 43 are connected by conductors 44 back to operand cache 42. Operand cache 42 also is connected by conductors 45 to a main bus 46, to which a global memory 48 is connected by means of conductors 47. Conductors 45 also connect operand cache 42 to instruction cache 2, as shown.

The instruction fetch pipeline 20 and the operand execute pipeline 16 are contained within a CPU (Central Processing Unit) 49. The operand execute pipeline 16 is conventional, and various implementation choices are readily available to those skilled in the art. It operates on the contents of the instruction buffer in the same general fashion as prior art operand execute pipelines.

In accordance with the invention, the instructions are "gated" of the instruction buffer 13 at execution rates determined by the number of machine cycles needed to execute them. This allows operand execution pipeline 16 to execute instruction at its maximum rate at long as FIFO buffer 13 is not empty.

The early instruction decode information obtained from PROMs 6 and 10 allows the instructions to be executed more quickly in the operand execute pipeline 16 than the original instruction codes. In prior systems, ordinarily no instruction decoding is done in the instruction fetch pipeline. However, in accordance with the present invention, "early decoding" in the instruction fetch pipeline allows simplified subsequent decoding of very complex CISC (Complex Instruction Set Computer) instructions, the decoded results of which then can be more easily, rapidly executed in the operand execute pipeline 16 than if no such early decoding is performed. As a result of this aspect of the invention, the computer system containing it achieves execution of CISC instructions nearly as fast as industry averages for execution of RISC (Reduced Instruction Set Computer) systems, and also achieves the advantages of using powerful CISC instructions.

Note that every 16 bits of instruction information from the instruction cache is used to generate another 16 bits of early decode information for a 16 bit instruction, a 32 bit instruction, or 48 bit instruction. The operand execute pipeline 16 then can receive all of the decoded information needed to execute the present instruction in a single cycle, regardless of whether the present instruction is a 16 bit instruction, a 32 bit instruction, or a 48 bit instruction. For most instructions, the 16 bits of early decode information produced by the PROM is all that is needed for fast execution by the operand execute pipeline 16, without use of any of the original 16 bits of the instruction.

The techniques described herein, together with improved cache coherency techniques, use of an enlarged large operand cache and use of other improved cache techniques has been found to reduce the Average Instruction Time (AIT) down from the 10 to 12 machine cycles per instruction for typical CISC computers to between 1.2 and 1.5 machine cycles per CISC type instruction. This is a dramatic decrease in execution instruction time for a CISC type machine. A major portion of this improvement is due to the early decoding technique.

The operand execution pipeline 16 gates instructions out of the instruction buffer 13, by providing a signal 17 indicating it has executed the current instruction, a signal indicating the length of the current instruction. It has been found in a present embodiment of the invention that the average instruction length executed in a single machine cycle clock time T is roughly 24 bits, and the instruction fetch pipeline 20 fetches at an average rate of about 32 instruction bits per machine cycle T, so the instruction fetch pipeline can "get ahead" of the operand execute pipeline 16. Thus, the system described in FIGS. 1 and 2 usually fetches instructions at a faster rate than the rate at which instructions are being executed. The "ideal" average instruction execution time is degraded by delays caused by the instruction fetch pipeline and by delays caused by the operand execution pipeline. The primary factor causing such delays is cache misses in the instruction fetch pipeline.

Figure 3:
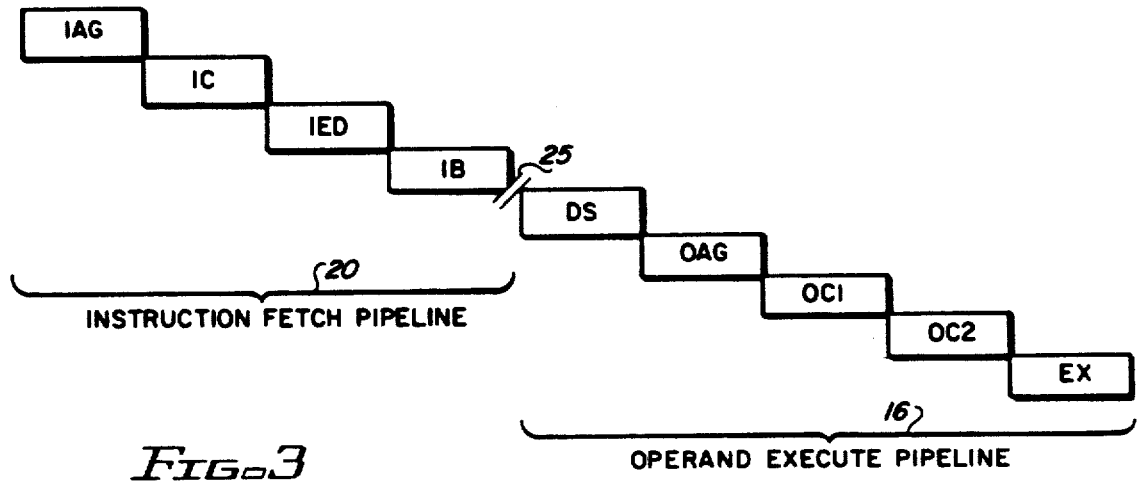
FIG. 3 is a diagram illustrating the relationship between the instruction fetch pipeline and the operand execute pipeline of FIG. 1.

The fact that the instruction fetch pipeline can "get ahead" of the operation execution pipeline 16 allows the system of FIGS. 1 and 2 to "hide" some of the cache miss time because the operand execute pipeline 16 can continue executing prefetched instructions during part or even all of a cache miss delay. In FIG. 3, numeral 25 represents the above described loose coupling of instruction fetch pipeline 20 to operand execute pipeline 16 effectuated by FIFO buffer 13, allowing instruction fetch pipeline 20 to get ahead of operand execute pipeline 16. A very substantial improvement in performance, i.e., instruction execution rate, is achieved.

ZERO TIME MOVE INSTRUCTION

Next, it will be convenient to describe a method of effectively achieving a "move" instruction in zero time as a result of the above described pipeline structure.

The fact that two consecutive 16 bit instructions are simultaneously loaded into the instruction registers 4 and 8, the outputs of which are simultaneously decoded by early instruction decode PROMs 6 and 10, makes it possible for the operand execute pipeline 16 to "scan" or examines the output of instruction buffer 13 and determine if two instructions which normally would be executed on successive machine cycles are closely related.

Many CPUs, including the ones included in the computer system in which the present invention is utilized, are only capable of executing what are referred to as "2 operand constructs". A "construct" is a primitive statement in a computer program. CPUs that cannot perform "3 operand constructs" typically use 2 machine instructions to perform an operation using what are referred to as "2 operand constructs". For example, suppose the desired operation is to add the contents of location A to the contents of location B and put the results into location C. That is a 3 operand construct. Most CPUs need to carry out operation of such a 3 operand construct in the following fashion. First, a "move" instruction is executed that moves the contents of location A into location C. The CPU then would execute an add instruction that would add the contents of location B to location C and put the results back into location C, thereby "synthesizing" a 3 operand construct. However, the additional move instruction requires an extra machine cycle.

Because of the ability of the above described system 1 to perform the early decode function described above, as soon as the move instruction and the add instruction mentioned above are loaded into the operand execute pipeline 16, the machine also can immediately determine that the move instruction can be "linked" with the next add instruction. The system can then "collapse" the two instructions by simultaneously interpreting the early decode of the move and add instructions and, upon recognizing their relationship, using this information to apply the operand A to one input of an ordinary ALU, apply to operand B to the other input of the ALU, and obtain the sum A+B at the output of the ALU and write the sum into destination location C in a single machine cycle. The "move A" instruction associated with the add instruction therefore, in effect, becomes invisible. In other words, even though the instruction list includes a move instruction immediately followed by an add instruction, the above described system allows the add function to be performed without waiting for the move instruction to be executed first. Note that this technique is equally applicable to subtract instructions, shift instructions, and other instructions that are normally included in programs as 3 operand constructs.

ZERO TIME BRANCH INSTRUCTION

Figure 4A:
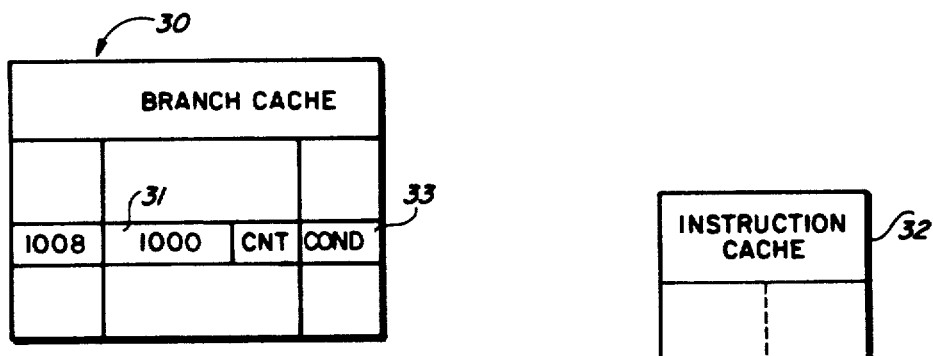
FIGS. 4A-4C are diagrams useful in illustrating the technique of executing a branch instruction with, in effect, zero time in a pipeline structure.

FIG. 4A shows a high speed branch cache memory 30 which is accessible by a high speed CPU (not shown). Reference numeral 31 designates a line of data in branch cache 1.

Approximately one fourth of all executed instructions in a computer typically are branch instructions. Therefore, the particular branch instruction methodology that a particular computer uses to handle branch instructions can have a very significant impact on overall computer performance. A branch cache is a cache memory that is located in an instruction fetch pipeline. A branch cache includes a table associating addresses of branch instructions with the addresses of their target instructions based on previous executions of the branch instructions. The branch cache contains "target" addresses to which a branch instruction points if the branch condition is met.

Branch instructions frequently are used in loops which are repeated many times until a certain condition is met. Following is an example of a loop containing a branch instruction:

| 1000 MOV A to B | (This is the beginning of a loop) |
| --- | --- |
| 1004 Add 1 to COUNT | |
| 1008 CMP COUNT and 900 | (Compare present value of COUNT to final value 900) |
| 100C BNE | (Branch to target address 1000 if COUNT is not equal to 900.) |
| 100E NEXT | (Next address in program instruction cache 2) |

A common procedure in a high performance computer is to use a branch cache which stores the association between the address of a "taken" branch instruction and the address of its target instruction.

Figure 4B:
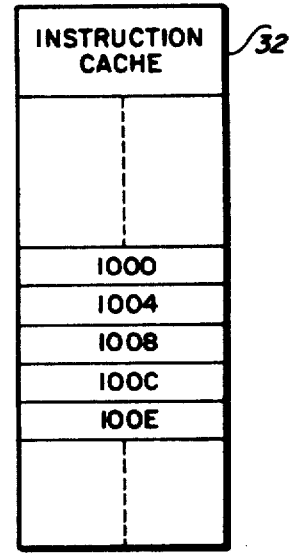
Figure 4C:
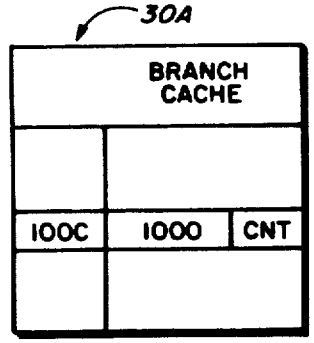

On a first pass through the above loop, executing the above instructions in a program which is stored in an instruction cache 32 of FIG. 4B, instructions 1000, 1004, 1008, and 100C are sequentially fetched in the instruction fetch pipeline 20 and passed to the operand execute pipeline 16. The condition of the BNE (Brnach if Not Equal) instruction is not met if COUNT is equal to 900. Since COUNT is not equal to 900, the branch in this case is "taken", and this necessitates going back to target address 1000 in the instruction cache and aborting or cancelling the entire instruction and operand flow in both the instruction fetch pipeline 20 and the operand execute pipeline 16, which is very time-consuming. As the instruction fetch is reestablished at the target address 1000, the prior art branch cache shown in FIG. 4C is written with information associating the address of the branch instruction 100C and the address of the target instruction 1000 and a control field (CNT) indicating a "taken branch".

Then, the instruction fetch pipeline 20 can use that information in the branch cache 30A to "predict" changes in the instruction stream based on previous instruction executions. On the second pass through the loop, instruction fetch pipeline 20 will detect a "branch cache hit" at address 100C and send to the operand execute pipeline 16 a bit from the CNT field which indicates this is a branch that is "predicted" to be taken again on the basis of the prior pass. Additionally, the branch cache hit will cause the instruction fetch pipeline to discard the sequential fetching and begin fetching at the target address 1000.

In the above example of the prior art, on the second pass through the loop in the instruction cache 32, instructions 1000, 1004, 1008, and 100C are fetched, and at 100C the program takes a "branch cache hit". This causes the instruction fetch pipeline 20 to stop fetching instructions sequentially, and prevents aborting the instruction fetch stream and the operand execute pipeline stream and lets the program go back to the target address 1000 in the instruction cache 32. This is repeated, and a branch cache hit is taken on each pass through the loop until the 900th pass, with no time-consuming aborting of the instruction fetch and operand execute pipeline (until the 900th pass). This results in a substantial improvement in performance.

As an improvement over the foregoing, in accordance with the present invention, what has been done is to:

(1) write the information into the branch cache that prevents aborting the instruction fetch pipeline 20 and the operand execute pipeline 16 at the address of the instruction preceding the branch instruction, i.e., 1008 instead of 100C, (2) make the branch cache memory 30 somewhat "wider" than the prior art branch cache memory 30A (so it has more bits per line), and (3) write the branch condition into an extra field 33 provided in the widener branch cache. Then, on every pass through the loop (except the first pass), a branch cache hit is taken at the instruction preceding the branch instruction, i.e., at COMPARE instruction 1008 instead of BNE instruction 100C, so the loop is repeated many times, without every fetching and executing the branch (BNE) instruction.

Stated differently, the "link instruction" that would normally be associated with the branch instruction BNE has been moved to the immediately prior instruction (which in this case is the compare instruction), and the branch instruction has effectively been eliminated from the loop for all except the first and last passes. In other words, the four instructions at addresses 1000, 1004, 1008 and 100C are effectively executed in three machine cycle times instead of four, resulting in a 25% improvement in performance over the prior art for all repetitions of the loop except the first and last. In a program with a lot of loops, this represents a very substantial improvement in overall system performance.

The following Table 1 indicates the flow of hexadecimal addressed 1000, 1004, 1008 and 100C, etc., in successive increments up to 28, with hexadecimal notation for the address increments in each entry except the first entry in each row, through each of the stages of the instruction fetch pipeline 20 and the operand execute pipeline 16.

TABLE 1

|     |      |      |      |      |    |    |    |    |    |    |    | BRANCH HIT • | CACHE HIT • | • |   |   |   |   |   |
|-----|------|------|------|------|----|----|----|----|----|----|----|----|----|----|----|----|----|----|----|
| IAG | 1000 | 4    | 8    | C    | 10 | 14 | 18 | 1C | 20 | 24 | 28 | 0  | 4  | 8  | 0  | 4  | 8  | 0  | . . . |
| IC  |      | 1000 | 4    | 8    | C  | 10 | 14 | 18 | 1C | 20 | 24 | 28 | 0  | 4  | 8  | 0  | 4  | 8  |   |
| IED |      |      | 1000 | 4    | 8  | C  | 10 | 14 | 18 | 1C | 20 | 24 |    | 0  | 4  | 8  | 0  | 4  | 8 |
| IB  |      |      |      | 1000 | 4  | 8  | C  | 10 | 14 | 18 | 1C | 20 |    |    | 0  | 4  | 8  | 0  | 4 8 |

PREDICTED
AS TAKEN
! !

|     |   |   |   |      |      |      |      |    |    |    |    |   |   |   |   |   |   |   |   |
|-----|---|---|---|------|------|------|------|----|----|----|----|---|---|---|---|---|---|---|---|
| DS  |   |   |   |      | 1000 | 4    | 8    | C  | 10 | 14 | 18 | 1C |   | 0 | 4 | 8 | 0 | 4 | 8 | 0 |
| AG  |   |   |   |      |      | 1000 | 4    | 8  | C  | 10 | 14 | 18 |   | 0 | 4 | 8 | 0 | 4 | 8 | 0 . . . |
| OC1 |   |   |   |      |      |      | 1000 | 4  | 8  | C  | 10 | 14 |   | 0 | 4 | 8 | 0 | 4 | 8 | 0 |
| OC2 |   |   |   |      |      |      |      | 1000 | 4 | 8 | C | 10 |   | 0 | 4 | 8 | 0 | 4 | 8 | 0 |
| EX  |   |   |   |      |      |      |      |      |   |   |   | •  |   |   |   |   | ? |   | ? |
|     |   |   |   |      |      |      |      | 1000 | 4 | 8 | C |    |   | 0 | 4 | 8 | 0 | 4 | 8 | 0 |

%————————FIRST PASS————————%—2ND PASS—%—3RD PASS-%

PIPELINES
CANCELLED
AS BNE
IS EVALUATED

EVALUATION
OF CONDITION
CODE FROM
BRANCH CACHE

1ST PASS    2ND PASS    3RD PASS

---

In Table 1, "X" shows where the pipelines are aborted or cancelled as the BNE instruction is evaluated on the first pass through the above loop. "•" indicates where branch cache hits occur at address 1008 as subsequent passes are made in accordance with the present invention, and the program returns to the target instruction 1000 without executing the BNE instruction. "!" indicates where to decode/select part of the operand execute pipeline 16 scans the predecoded results and "predicts" and the branch will be taken. "?" indicates where the branch condition retrieval from the branch cache is evaluated. The symbols "%" indicate the beginnings of the first, second, and third passes through the loop. It can be readily seen that the first pass takes a long time, due to aborting of instructions in the pipelines. From then on, each pass takes far less time due to the branch cache hits, as indicated by the intervals designated "2nd pass" and "3rd pass".

Figure 6:
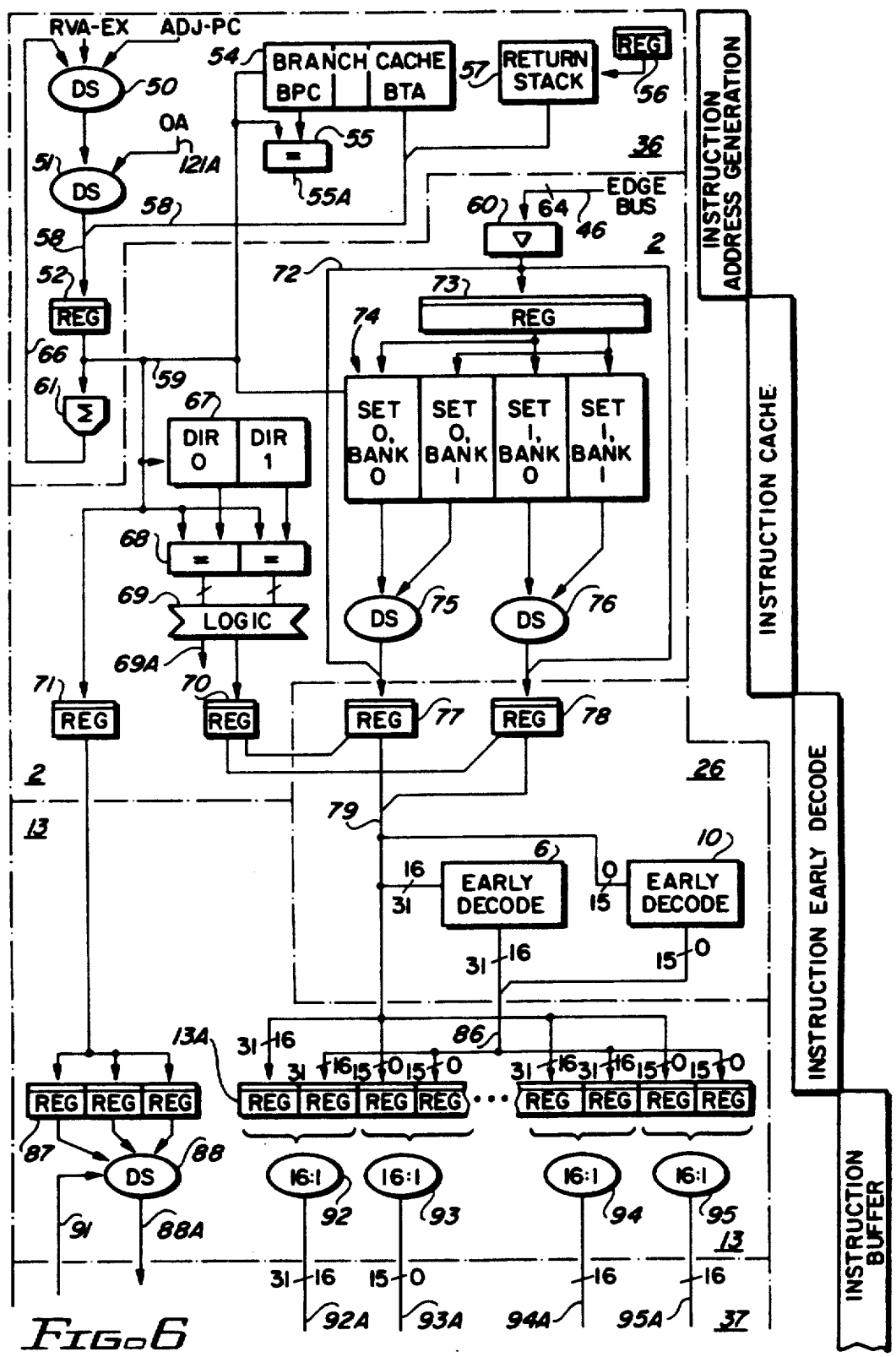
Figure 7B:
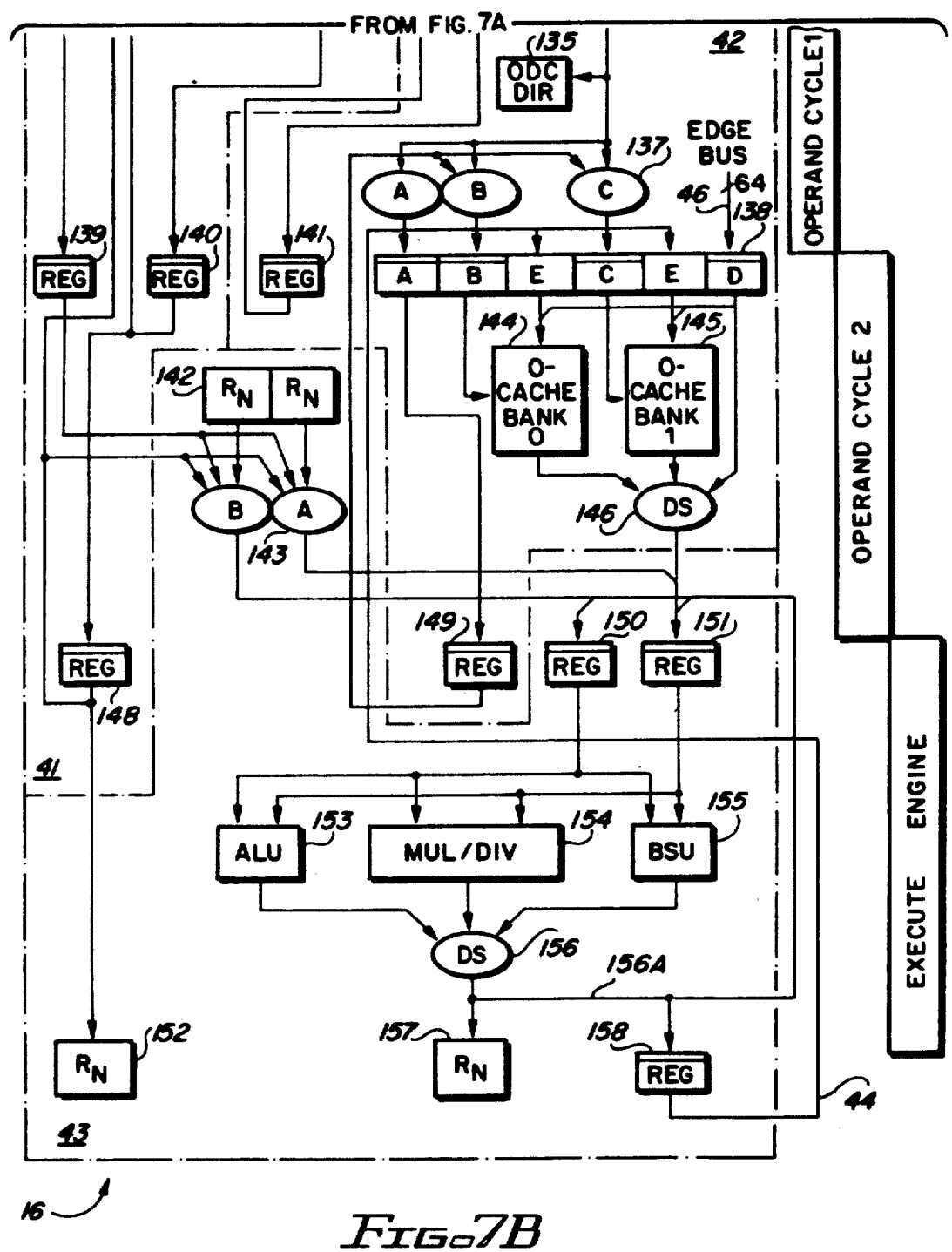

FIGS. 6, 7A and 7B show the detailed structure of the instruction fetch pipeline 20 and operand execute pipeline 16. In FIG. 6, the signal RVA-EX (which represents the regenerated virtual address from the execute cycle) and ADJ-PC (which represents the adjusted program counter value from the execute cycle) are fed into data selector (DS) circuitry 50. Data selector circuitry 50 and the other oval-shaped "data selector" elements in FIGS. 6, 7A, and 7B represent combinatorial gating circuitry that can easily be implemented by those skilled in the art from truth tables which also can be readily constructed by those skilled in the art by relating the input variables to the output variables. Numeral 36 designates the address generator of the instruction fetch pipeline 20, as shown in FIG. 5. The function of address generator 36 is to determine the next instruction fetch address. The output of data selector logic 50 and a signal OA (which represents general address 121A (FIG. 7A)) are applied as inputs to data selector logic 51, the output of which produces a set of signals 58 that are applied to the inputs of register 52. Register (REG) 52 contains the address of the next instruction to be fetched from the instruction cache 13. The outputs of register 52 produce output signals on conductors 59.

The signals 58 can also be generated by a branch cache 54 for complicated instruction sequences. Branch cache 54 includes a branch program counter BPC and a branch target address BTA which is a table that associates branch program counter values with branch target address values. Some of the digital signals 59 are utilized to index into branch cache 54. The remaining bits of signals 59 are input to a digital comparator 55 that compares them to the output of the branch program counter to produce a branch cache hit signal 55A, which is coupled to circuitry for selecting the address to be gated onto bus 58. In the event of a branch cache hit, the branch target address BTA is placed on bus 58 and input to instruction fetch register 52 to become the next instruction fetch address.

The bus 58 also is connected to the output of a return stack LIFO (last in, first out) buffer 57. Return stack register 56 is used to read from the return stack 57 if the instruction fetch pipeline detects a return instruction, in which case the output of return stack buffer 57 becomes the next instruction fetch address carried on bus 58 and entered into instruction fetch register 52. Return stack 57 contains a last in, first out stack of return addresses. The addresses contained in the return stack represent the instruction addresses to resume execution after a subroutine has completed execution. This is useful because certain subroutines may be called up by a large number of users. Standard branch cache techniques do not work for return instructions. Traditional branch cache implementation fails for return instructions if there are multiple calls to a single subroutine within one large loop. This is because the branch cache target address will always reference the previous call rather than the current call and will return to the wrong address every time. Reference numeral 56 designates a number of return stack address registers which point to the top of the return stack. This allows return addresses to be "popped off" the top of the return stack as return instructions are executed, ensuring that each return address points back to the correct portion of the main program upon completion of a subroutine.

The next instruction fetch address contained in register 52 is applied to the inputs of an adder 61, which performs the function of generating the next sequential instruction fetch address. The outputs of adder 61 are fed back via conductors 66 to inputs of data selector logic 51.

The instruction fetch bus 59 also is connected to load register 71. Bus 59 also conducts the outputs of the instruction fetch register 52 into instruction cache storage 74, which is implemented by means of static random access memories (SRAMS). Cache storage 74 is divided into two sets, namely Set 0 and Set 1, each of which is divided into two banks called Bank 0 and Bank 1. The inputs of Set 1 are connected to receive 32 bits, respectively, of 64 bit register 73, the other 32 bits of which are loaded into Set 0. The inputs of register 73 are coupled by a 64 bit bus 72 and a buffer 60 to the 64 conductors of high speed bus 46.

Some of the conductors of instruction fetch bus 59 are provided as inputs to instruction cache directly 67, which has two sections DIR0 and DIR1, the outputs of which are connected to inputs of digital comparator logic 68. The outputs of the DIR0 and DIR1 are compared with the remaining bits on instruction fetch bus 59. Instruction cache directory 67 is implemented using SRAMS. The comparator logic 68 determines if the instruction fetch address on bus 59 is mapped into the instruction cache location defined by the contents of directory 67. The outputs of digital comparator logic 68 are fed into combinatorial logic 69 which determines if the desired instruction is currently mapped into the instruction cache and loads a two bit register 70 that selects Set 0 or Set 1 of instruction cache storage 74.

Data selector logic 75 and 76 determines whether Bank 0 or Bank 1 is selected from each of Set 0 and Set 1 in response to signals produced in combinatorial logic 69 in response to one bit of bus 59. The outputs of data selector logic 76 and 76 load 32 bit registers 77 and 78, the outputs of which are selected by two bit register 70. The outputs the registers 77 and 78 are connected to 32 bit bus 79 which conducts the instruction fetched from the instruction cache 2.

In the event of an instruction cache miss, logic 69 generates an instruction cache miss signal 69A that causes the processor 49 (FIG. 5) to send out the address of the desired instruction on 65 bit bus 46. This results in accessing of a 16 byte line containing the desired instruction from global memory 48 (FIG. 5) which sends back the desired instructions on bus 46 to instruction cache 2. Bus 72 routes the instruction thus obtained around instruction cache storage 74 to the inputs of registers 77 and 78, saving the time that would be required to route the instruction through instruction cache storage 74 and data selector logic 75 and 76. But 72 also loads the instruction fetched from global memory 48 into register 73. The instruction is loaded from there into the appropriate set of instruction cache storage 74.

The early decode circuitry 26 includes the above mentioned registers 77 and 78 that receive the 32 bit instructions gated out of the instruction cache storage 74 or fetched via bus 46 from the global memory 48. The 32 bit instruction selected by the two bits in register 70 from either register 77 or register 78 onto bus 79 is entered into the early decode programmable read only memories (PROMS) 6 and 10. PROM 10 decodes 16 of the instruction bits to produce predecoded Bits 0–15 and early decode PROM 6 decodes the other 16 bits of the instruction to produce predecoded Bits 16–31. Bits 0–31 are carried by 32 bit bus 86 into instruction buffer 13, which includes register 13A. Instruction buffer 130 also includes register 87 which stores the instruction fetch address received from register 71. Register 13A is a FIFO buffer containing sixteen 32 bit locations. The 32 bit undecoded instruction bits on bus 79 also are loaded directly into FIFO buffer 13A.

The two major inputs of the instruction buffer 13 thus are the 32 bits of undecoded instruction on bus 79 and 32 predecoded instruction bits on bus 86. Each 32 bit register includes 16 bits from instruction bus 79 and 16 bits from the early decode PROM 6, 10 on bus 86. Two 32 bit registers in instruction buffer 13A are written at once, so the 64 bits form two 32 bit entries. The instruction buffer 13 includes data selector logic 92, 93, 94, and 95, each of which is sixteen-to-one data selector that looks at all sixteen 32-bit entries within FIFO instruction buffer 13A and selected one of the 16 bit entries. For example, data selector 92 is connected to the upper 16 bits of each of the sixteen 32 bit instruction buffer entries and selects the next operand word as determined by the operand execution pipeline controller circuitry 37 (also see FIG. 5) to be gated into the operand execution pipeline 16. Data selector 93 is used to select the appropriate early decode information for that instruction and simultaneously gate it into the operand execution pipeline 16. Data selector 94 and 95 select first and second extension words of the next operand word and gate them into the operand execution pipeline 16.

The instruction fetch address in register 87 is applied to the inputs of data selector logic 88, which produces the next program counter value on conductors 88A to be loaded into register 89 of FIG. 7A. The outputs of register 89 are applied to inputs of an adder 90, the other inputs of which receive a signal 2*ILN (which represents the length of the instruction in bytes) and produces a digital signal representing the next sequential program counter value on conductors 91 which are fed back to inputs of data selector logic 88.

The predecoded bits in the selected entry of FIFO buffer 13A for the vast majority of instructions are used to control the execution thereof in the operand execution pipeline 16. On more complex instructions that require additional decoding, multiple cycles are required to execute the contents of register 100A, in which case the contents of register 100A are further decoded by logic circuitry 97, the outputs of which are carried by conductors 98 back into input of data selector logic 96 and reloaded into the early decode bits of register 100B.

The outputs of data selectors 92, 93, 94, and 95 are applied to inputs of operand execution controller 37, and more specifically to inputs of register 100A, data selector 96, and register 100B, respectively. The outputs of register 89 are applied as inputs to adder 110 and the adder 90 mentioned above. The output of adder 110 is applied as an input to data selector logic 112. Some of the outputs of register 100A are loaded into data selector logic 112 and some to logic 97. Logic circuitry 97 uses information contained in registers 100A and 100B for certain complex instructions to determine the next state to be loaded back into the early decode register 100B via data selector 96.

The above-mentioned "scanning" of predecoded bits to enable the operand execution pipeline 16 to determine if two instructions are closely related in order to perform a zero time move instruction or a zero time branch instruction also is performed by combinatorial logic 97. For example, combinatorial logic 97 receives the contents of register 100B and compares several fields to determine if one is for a move instruction and another is for an instruction, such as an add instruction, which can be "collapsed" with a move instruction and executed accordingly, as described earlier. Combinatorial logic 97 then feeds this information back to register 100B via path 98, so data selector 112 can accordingly effectuate execution of the collapsed move and add instructions in a single machine cycle. Combinatorial logic 97 also is used to examine a field from register 100B to determine if the point of association is the branch instruction address or the address of the instruction preceding the branch instruction. The results of this determination are sent to the branch cache 54 and used to control the write address of the branch cache entry. If the point of association is on the instruction preceding the branch instruction, the program counter address of this instruction is use to write the branch cache entry in order to facilitate the zero time branch instruction described previously. If the point of association is the branch instruction address, the branch cache is written using the address of the branch instruction, which results in a predicted branch operation requiring one machine cycle.

The outputs of the two sixteen bit sections of registers 100C are input to a data selector logic 112 to gate the two extension words of certain instructions thereto.

The output of data selector 112 produces the signals 38 which are output on conductor 38 to the address generator logic 41. The bus 38 is connected to inputs of register 113 and to data selector 115. The operand execution pipeline control logic 37 operates on the present contents of registers 89, 100A, and 100C and performs a series of logical and arithmetic functions to calculate a "displacement value" that is produced on bus 38. This calculation is performed for addressing modes as required for programmed relative logic. The outputs of data selector logic 111 and the outputs of register 89 are summed to calculate a program counter relative address. The inputs of data selector 111 come from registers 100A and 100C. Data selector logic 112 extracts certain bit fields out of registers 100A and 100C to form different displacement values.

Based on the contents of the early decode information produced in PROMS 6 and 10 and contained in register 100B, one control field selects the appropriate address displacement and outputs it through data selector 112 onto bus 38. In the "Decode/Select" section of the operand execution pipeline 16 shown in FIG. 7A, the select part of that cycle selects the components to be added together to form a partial operand address by accessing the register file 114. Register file 114 contains a "program visible copy" of all of the machine registers, and has two read out ports, one of which outputs a 32 bit base value into data selector logic 116, the other port outputting a 32 bit index value to data selector logic 117. The operand address to be calculated is the summation of the three components, including the displacement value on bus 38 input to data selector 115, and the components contained in register file 114, and a feedback value produced by data selector 118. The components are loaded into three 32 bit registers 118A, the outputs of which are connected to Sections A, B, and C, respectively, of data selectors 119.

In the next cycle of operation, called the operand address generation cycle, the three 32 bit components of the address from register 118A produce the final displacement value in the output of section A of data selector 119, the base value at the output of section B of data selector 119, and the final index at the output of section C of data selector 119. The data selector logic 119 generally performs the function of dealing with misaligned operand addresses. Precisely how this is done is beyond the scope of the present invention, but data selector logic 119 can be omitted by those who choose not to deal with misaligned operand addresses. The three 32 bit quantities produced by the data selector logic 119 are applied to inputs of a 32 bit full adder 120, the output of which is applied to data selector 121. The output of data selector logic 121 is the operand address OA on conductors 121A required for accessing the operand cache.

The operand address is input to data selector 122 and 123 in operand cache 42. The respective outputs of data selectors 122 and 123 are applied to inputs of registers 126 and 127 in operand cache 42.

Operand address generating logic 41 also includes "tracking" logic. In situations where the instruction refers to an "immediate operand" (i.e., an operand contained within an instruction), wherein the immediate operand would have been calculated by the pipeline control logic 37 and particularly data selector 112 thereof. The bus 38 is applied to the inputs of register 113, which is an immediate operand pipeline register. Register 124 receives the output of register 131 and also is an immediate operand pipeline register, and its outputs are fed into register 139, which also is an immediate operand pipeline register. The net effect of registers 113, 124, and 139 are to stage the immediate operand down from the decode/select stage of the operand execution pipeline to the operand cycle 2 stage of the pipeline. The outputs of register 139 are fed into sections A and B of data selector 143.

For operand address values received by data selector 121, "tracking logic" for those address values is performed by series connected registers 125, 140, and 148, the output of adder 120 being connected to the input of register 125, the output of which is connected to register 140. The output of register 140 is connected to the input of register 148. The outputs of registers 125, 140, and 148 are connected to corresponding inputs of data selector 118. The output of adder 120 also is connected to inputs of data selector 118. The output of data selector 118 is connected to inputs of data selector 116. The net effect of this logic is to provide a bypass mechanism whereby by pending register file updates can be routed back through data selector 118 and through data selector 116 back into an address calculation to minimize pipeline delays.

The tracking logic stages down operand addresses just calculated and in the event that the contents of one of the registers in the data tracking logic is required for a subsequent address calculation, that value, as identified in the data logic 118, is fed back into data selector 116 to compute the above base value. The tracking logic is sued to "bypass" updated, pending address register contents back into the address generation logic to minimize pipeline breaks or delays. The pipeline delays are minimized since this logic allows bypassing of pending register file updates back into the address calculation logic. This method is faster than waiting for the actual update to occur and then reading the updated value of the register file 114.

Next, the operand cache 42 includes data selectors 122 and 123 each of which receives the operand address from data selector 121. Data selector 121 also receives the output produced by section B of data selector 119. Data selector 122 receives the instruction fetch address (IFA) 159 derived from register 52. Data selector 122 loads a virtual address into register 126 and data selector 123 loads a cache directory address into register 127. The output of register 126 contains a virtual address which is used to index into translation lookaside buffer (TLB) 128. Some of the bits of register 126 are applied to the inputs of a translation lookaside buffer 128 and others to a digital comparator 130 that compares the virtual page number tag from translation lookaside buffer 128 to produce a translation lookaside buffer hit signal on conductor 130A. In the event of a TLB miss, signal 130A is used to control the fetching of the desired TLB entry. All of the outputs of virtual address buffer 126 are applied to inputs of pipeline register 141. The outputs of register 141 are applied to inputs of both data selector 122 and 123 to perform the function of restarting the pipeline in the event of a TLB miss.

In the event of a translation lookaside buffer hit, the physical address is produced on bus 160 and applied to the inputs of an operand direct cache directory 135 and also to inputs of four digital comparators 131. Note that the operand cache structure is described in more detail in pending application entitled "COHERENT CACHE STRUCTURES AND METHODS", filed concurrently herewith, by Daniel M. McCarthy, Joseph C. Circello, Gabriel R. Munguia, and Nicholas J. Richardson, Ser. No. 240,747 and assigned to Edge Computer Corporation, incorporated herein by reference.

In parallel with that function, the cache directory address and register 127 is used to index into the four associative cache directories 129. All four associative cache directories 129 are indexed in parallel and simultaneously output four values that correspond to the current physical address that is mapped into the associative cache location. The outputs of the four directories 129 are stored tag bits that are compared with the current physical address on bus 160. The associative cache hit signals applied to logic 136 cause it to determine if the desired physical address 160 corresponding to the present operand is currently mapped into the operand associative cache. Part of the physical address 160 is indexed into the operand direct cache directory 135, so the physical address on bus 160 either steers the present operand access into the operand associative cache storage 144 or the operand direct cache storage 145. The data accessed from either storage 144 or 145 is input to data selector logic 146.

In the event of an operand cache miss, logic responsive to a miss signal 136A outputs the physical address onto bus 46 to fetch the requested operand from global memory 48 or from another cache, in accordance with the cache coherency technique described in the above incorporated by reference co-pending applications and loads that 64 bit operand into section D of register 138, which then loads 32 bits into the operand cache 144 and 145 and bypasses the caches to input that fetched operand into data selector 146.

At the beginning of the operand cycle shown in the right hand portion of FIGS. 7A and 7B, sections A, B, and C of register 138 contain address values that correspond to the desired access. The data selection logic identified in sections B and C of 137 plus register 138 sections B and C allow independent operations to be performed on operand cache Bank 144 and operand cache Bank 145. This design allows one read operation to be going on in parallel with one write operation and thereby minimizing any pipeline delays. The back selection logic 146 selects the operand from the Bank 0 of operand cache 145 or Bank 1 of operand cache 144 to produce a single operand, which is loaded into register 151 of the execute engine 43.

The execute engine 44 includes register 151, the outputs of which are applied as inputs to an arithmetic logic unit (ALU) 153, a multiply/divide unit 154, and a barrel shift unit 155. At the same time register 151 is being loaded by data selector 156 at the end of the cycle designated at the right hand side of FIG. 7B as "operand cycle 2", operand pipeline control circuit 37 effectuates access of a register file 142 by causing sections A and B of data selector 143 to load the output of section B of data selector 143 into register 150.

If the present instruction does not require an access to the operand cache, then the operand will be loaded by section A of data selector 142 into register 151. As execute engine 44 begins operation, it has the desired operands loaded in registers 150 and 151. The outputs of the ALU, multiply/divide circuit, and barrel shifter unit 155 are applied to a data selector 156, the outputs of which constitute the execute results 156A. If the present instruction being executed does not require a memory write operation, the execute results 156A are loaded into a register file 157. If a memory write operation is required, the execute results 156A are loaded into register 158, the outputs of which are routed by conductors 44 back into section E of register 138 so that data can be written into the appropriate location of operand cache storage bank 144 or 145.

While the invention has been described with reference to a particular embodiment thereof, those skilled in the art will be able to make various modifications to the described embodiment without departing from the true spirit and scope of the invention.

What is claimed is:

1. A method for increasing a rate of execution of complex instructions in a pipelined processor, the method comprising operating a CPU of the pipelined processor to perform the steps of:

(a) generating an instruction fetch address;

(b) using the instruction fetch address to read and instruction from a memory and temporarily storing the instruction;

(c) decoding a plurality of bits of the instruction by means of a decoder in an instruction fetch pipeline in the CPU to produce a plurality of predecoded instruction bits;

(d) storing the instruction and the plurality of predecoded instruction bits in a fifo buffer in the instruction fetch pipeline;

(e) repeating steps (a) through (d) for additional instructions;

(f) transferring the instruction and predecoded instruction bits from the fifo buffer to an operand execution pipeline;

(g) executing the instruction in the operand execution pipeline in response to its predecoded bits, wherein steps (a) through (d) are collectively performed at a rate greater than a rate at which steps (f) and (g) are collectively performed to cause an accumulation of instructions and their predecoded instruction bits in the FIF buffer;

(h) repeating steps (f) and (g) for additional instructions and their predecoded instruction bits, respectively; wherein step (b) includes obtaining an instruction fetch address from a return stack storing addresses of instructions at which to resume execution of a main program after completion of subroutines.

2. The method of claim 1 wherein the return stack includes a LIFO buffer and a plurality of return stack address registers, the method including using the plurality of return stack registers to point to a top of the LIFO stack and popping off instructions from the top of the LIFO stack as return instructions are executed, respectively, to ensure that each return address points back to correct portions of a main program after completion of subroutines.

3. A method for increasing a rate of execution of complex instructions in a pipelined processor, the method comprising operating a CPU of the pipelined processor to perform the steps of:

(a) generating an instruction fetch address;
(b) using the instruction fetch address to read an instruction from a memory and temporarily storing the instruction;
(c) decoding a plurality of bits of the instruction by means of a decoder in an instruction fetch pipeline in the CPU to produce a plurality of predecoded instruction bits;
(d) storing the instruction and the plurality of predecoded instruction bits in a buffer in the instruction fetch pipeline;
(e) repeating steps (a) through (d) for additional instructions;
(f) transferring the instruction and predecoded instruction bits from the buffer to an operand execution pipeline;
(g) executing the instruction in the operand execution pipeline in response to its predecoded bits;
(h) repeating steps (f) and (g) for additional instructions and their predecoded instruction bits, respectively, the method further including increasing effective speed of executing a three operand construct by
(i) performing steps (a) through (e) in the instruction fetch pipeline to predecode first and second instructions which together represent a three operand construct, the first instruction being a move instruction to move the contents of a first location into a second location, the second instruction being an instruction that performs a predetermined operation on the contents of the second location and a third location, and putting the results of the predetermined operation into the second location;
(j) examining results of the predecoding in the operand execute pipeline during a first cycle of the operand execute pipeline operation to determine if the move instruction is linked to the second instruction;
(k) performing the predetermined operation on the contents of both the first and third locations int he operand execute pipeline if the move instruction is linked to the second instruction; and
(l) operating the operand execute pipeline to put the results of the performing of the predetermined operation in the second location without executing the move instruction.

4. The method of claim 3 wherein the second instruction is an add instruction.

5. The method of claim 4 including performing each decoding step in a single machine cycle by means of a programmed logic array in an instruction fetch pipeline.

6. The method of claim 3 wherein the second instruction is a subtract instruction.

7. The method of claim 4 wherein the second instruction is a shift instruction.

8. A method for increasing the rate of execution of complex instructions in a pipelined processor, the method comprising operating a CPU of the pipelined processor to perform the steps of:

(a) generating an instruction fetch address;
(b) using the instruction fetch address to read an instruction from a memory and temporarily storing the instruction;
(c) decoding a plurality of bits of the instruction by means of a decoder in an instruction fetch pipeline in the CPU to produce a plurality of predecoded instruction bits;
(d) storing the instruction and the plurality of predecoded instruction bits in a buffer in the instruction fetch pipeline;
(e) repeating steps (a) through (d) for additional instructions;
(f) transferring the instruction and predecoded instruction bits from the buffer to an operand execution pipeline;
(g) executing the instruction in the operand execution pipeline in response to its predetermined bits;
(h) repeating steps (f) and (g) for additional instructions and their predecoded instruction bits, respectively, the method further including increasing an effective rate of executing instructions of a program loop containing a branch instruction by
(i) writing first information into a branch cache during a first pass through the program loop to prevent aborting an instruction fetch pipeline on each subsequent pass through the loop, the writing occurring after execution of the branch instruction in the operand execution pipeline, the branch cache having enough bits to contain a branch condition, the address of an instruction immediately preceding the branch instruction and an address of a target instruction of the branch instruction;
(j) producing a branch cache hit at the address of the preceding instruction on every pass through the loop except the first pass, and causing the instruction fetch address to become a target address of the branch instruction;
(k) evaluating the branch condition from the branch cache in the operand execution pipeline in response to the branch cache hit and simultaneously executing the target instruction in the operand and execution pipeline to repeat the loop without fetching and executing the branch instruction; and
(l) aborting the instruction fetch pipeline on a last pass through the loop after the branch condition has been evaluated by the operand execution pipeline.

* * * * *